United States Patent [19]

Dudley

[11] Patent Number: 4,634,051

[45] Date of Patent: Jan. 6, 1987

[54] BREAK AWAY JOINT BOOM ASSEMBLY

[75] Inventor: Wayne C. Dudley, Parkersburg, Iowa

[73] Assignee: Top-Air Manufacturing, Inc., Parkersburg, Iowa

[21] Appl. No.: 841,870

[22] Filed: Mar. 20, 1986

[51] Int. Cl.[4] ............................................... B05B 1/20
[52] U.S. Cl. ..................................... 239/168; 403/146
[58] Field of Search ................. 403/146; 239/166–168

[56] References Cited

FOREIGN PATENT DOCUMENTS 1425162  2/1976  United Kingdom ................ 239/167
2038153  7/1980  United Kingdom ................ 239/168

Primary Examiner—Andres Kashnikow
Attorney, Agent, or Firm—G. Brian Pingel; Kent A. Herink

[57] ABSTRACT

A break away joint assembly for pivotally connecting an outer end boom section to a center boom section of an elongated spray boom to prevent movement of the outer section with respect to the center section from a normal condition in which the sections are colinear to a folded condition. The assembly includes a break away joint that pivotally connects adjacent lower ends of the boom sections and is formed of an inclined ramp disposed on an extension arm at the outer end of the center boom section, a stabilizing member fixed on an extension arm of the inner end of the outer boom section, and a yieldable biasing member extended through the stabilizing member and the center boom extension arm to form a yieldable connection there between.

5 Claims, 5 Drawing Figures

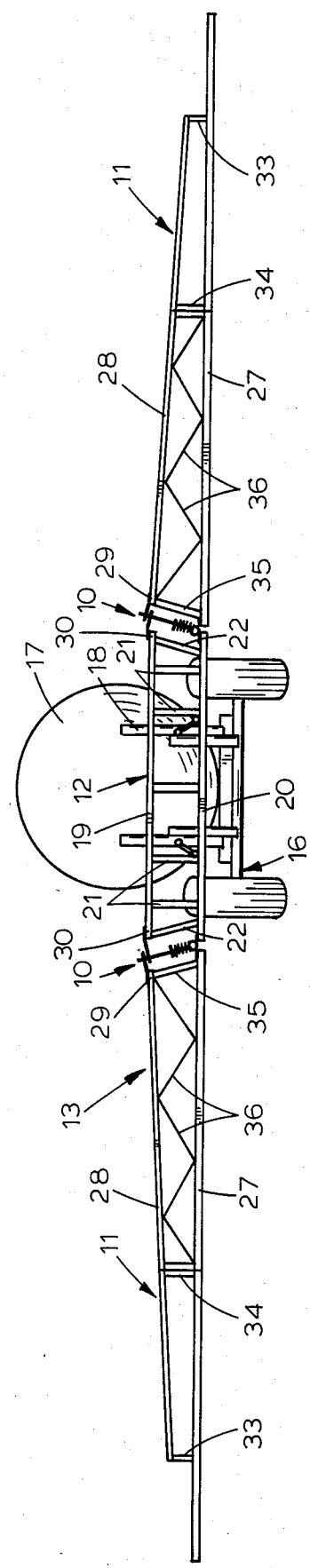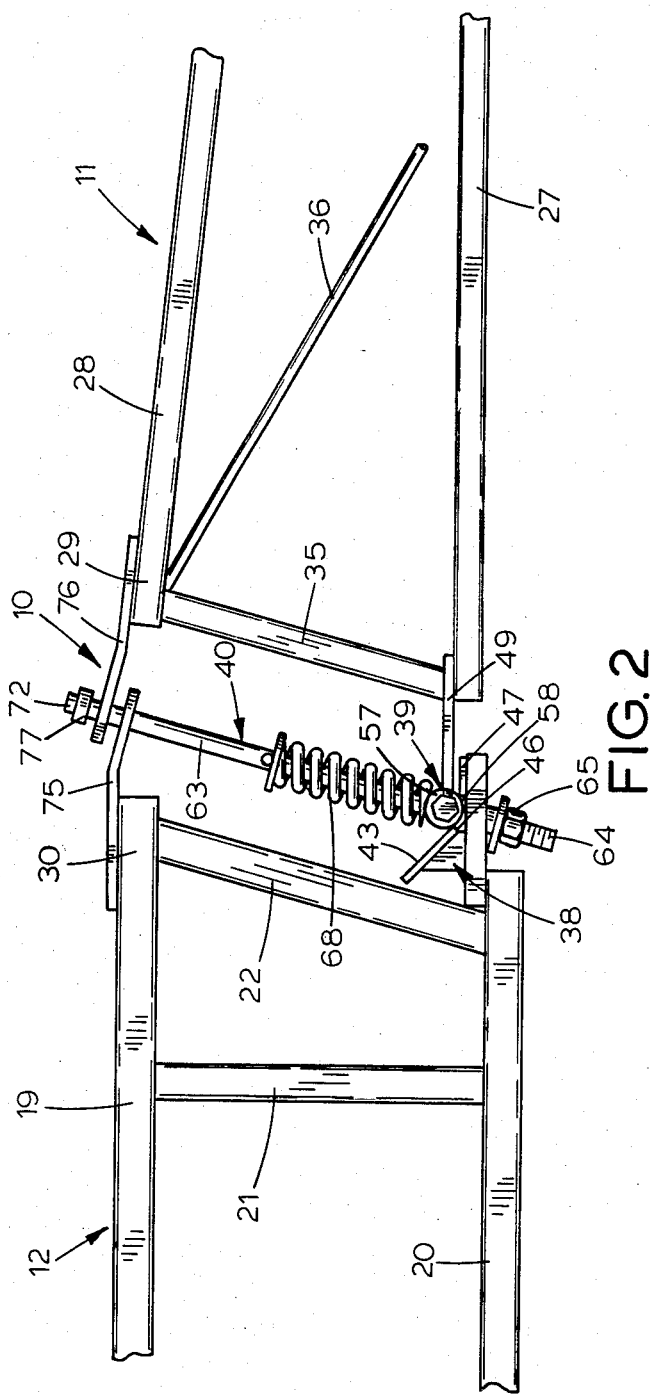

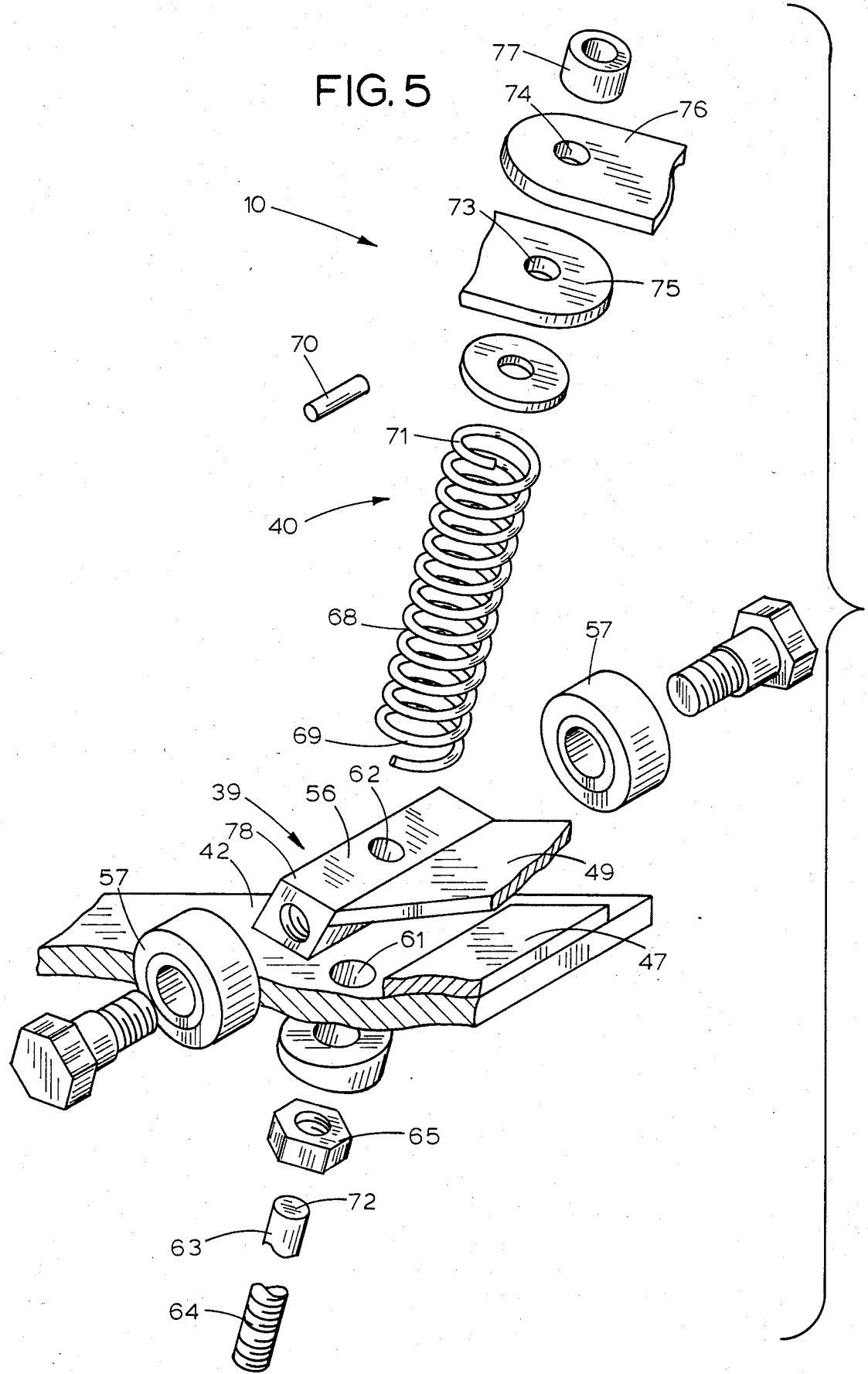

BREAK AWAY JOINT BOOM ASSEMBLY

BACKGROUND OF THE INVENTION

1. Field of the Invention

The present invention relates in general to elongated booms employed in spraying agricultural crops and more specifically, to such booms that are formed of a center boom section and opposite end or wing sections connected to the center section by break away joints that normally maintain the boom sections colinear but permit the wing sections to be pivoted with respect to the center section for reducing the width of the boom during non-operational conditions.

2. Description of the Prior Art

Standard equipment presently employed for spraying chemical herbicides, pesticides or the like on agricultural crops includes a trailer for carrying a chemical storage tank and an elongated spray boom extended transversely adjacent to the rear of the trailer. The spray boom has a plurality of spaced apart spray nozzles mounted thereon, and a pump and associate spray lines transfer the chemical from the storage tank to the spray nozzles.

To reduce the amount of time involved in spraying a field, long spray booms are being used that extend outwardly in cantilever fashion from opposite sides of the trailer on which they are mounted, and are formed of a center boom section and opposite end or wing sections pivotable with respect to the center section from a straight boom condition to a folded condition for reducing the length of the boom when it is in a non-operating condition.

Various types of pivotal connections between the end boom sections and the center section are known in the art to provide a coupling between the boom sections that will maintain the sections in a colinear alignment during normal operating conditions but will permit the boom to pivot to a folded condition if one of the end sections encounters an obstacle or it is desired to reduce the length of the boom to transport the spraying assembly from one location to another. The present invention provides a break away joint that achieves all of the above desired objectives and does so with a relatively simplistic construction and improved mode of operation.

SUMMARY OF THE INVENTION

The present invention provides an improved break away joint assembly for connecting an outer boom section to a center boom section of an elongated spray boom to permit pivotal movement of the outer section with respect to the center section from a normal condition in which the sections are colinear to a folded condition. The boom sections are each formed from a frame type construction that essentially includes upper and lower vertically spaced apart beam members connected together by at least two brace members, and the upper beam members of both sections are attached to one another by a connecting means that allows the sections to pivot with respect to one another.

A break away joint is employed for pivotally connecting together the lower beam members of the two boom sections and includes a first extension member extending outwardly from an outer end of the lower beam of the center section, a second extension member extending outwardly from an inner end of the lower beam member of the outer section, an inclined ramp member secured to an upper surface of said first extension member, a stabilizing means on the outer end of the second extension member that overlies the first extension member and is transversed to the second extension member and the inclined surface of said ramp when the boom is in its normal condition, and yieldable biasing means disposed through said stabilizing means and said first extension member for pivotally connecting the first extension member and the stablizing means together in such fashion that the stabilizing means is adjacent the lower end of the inclined surface of said ramp to thereby maintain said boom in its normal condition while permitting the stabilizing means to rotate about the longitudinal axis of the yieldable means as the outer boom section is pivoted from the normal condition to the folded condition.

In a preferred embodiment, one end of the yieldable biasing means also serves as the pivotal connection between the upper beam members of the center and outer boom sections, and the lower end of the yieldable biasing means is disposed in a through bore of said stabilizing means and an aperture in the first extension member to extend there through. The yieldable biasing means is formed of a tubular shaft on which a coil spring is located, which spring is in a partially compressed condition lying between the stabilizing means and abutment members located on the shaft to serve to urge the stabilizing means in a downwardly direction and to normally maintain it in a transverse orientation with respect to the inclined surface of said ramp and said extension member. To move the outer boom section relative to the center boom section, sufficient force must be applied to the outer boom section to overcome the biasing force applied against the stabilizing means by the coil spring to further compress the spring and permit the stabilizing means to rotate upon the inclined surface of the ramp.

It is an object of the present invention to provide an improved break away joint assembly that acts to normally maintain the boom in a straight configuration during spraying operations, but can be overcome by the application of force on the outer boom section to swing such section into a folded condition with respect to the center boom section when it is desired to transport the boom during periods of non-operation or to avoid obstacles in a field.

BRIEF DESCRIPTION OF THE DRAWINGS

FIG. 1 is a rear view in elevation of a spray boom including a preferred embodiment of the break away joint assembly of the present invention, which boom is shown in assembly relation with a trailer carrying a chemical storage tank;

FIG. 2 is a rear view of the break away joint of FIG. 1 for pivotally connecting together a center boom section and an outer boom section of the boom shown in FIG. 1;

FIG. 5 is an exploded perspective view of the break away joint of FIG. 2.

DESCRIPTION OF THE PREFERRED EMBODIMENT

Figure 3:
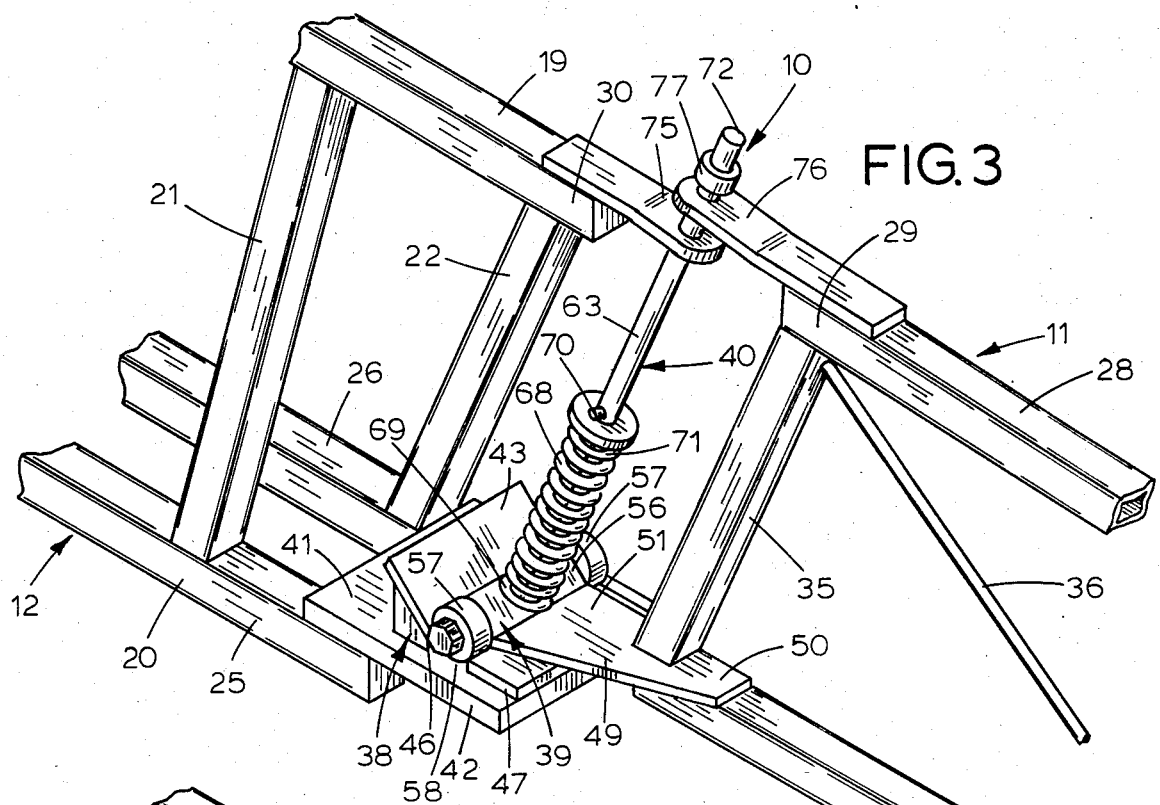
FIG. 3 is a perspective view of the break away joint shown in FIG. 2.

The present invention provides a break away joint assembly, shown generally at 10 in FIG. 1, for pivotally connecting an outer boom section 11 to a center boom section 12 of an elongated spray boom 13 for applying herbicides, pesticides or the like on agricultural crops. The spray boom 13 is normally mounted on the rear of a trailer 16 that carries a chemical storage container 17 and is attachable to a pulling vehicle by suitable means (not shown).

As indicated in FIG. 1, the center boom section 12 is attached to the trailer 16 by a boom support assembly, shown generally at 18, as described in my co-pending application filed Mar. 20, 1986, entitled "Self-Leveling Boom Assembly" U.S. Ser. No. 841,890 and incorporated herein by reference. The boom 13 is formed of a pair of outer boom sections 11 that are substantially mirror images of one another and are pivotally connected to opposite ends of the center boom section 12.

The center boom section 12 is of a rigid frame type construction that includes vertically spaced apart upper and lower horizontally extended beam members 19 and 20, respectively, connected together by a plurality of brace members 21 and 22. Preferably, the upper beam member 19 is formed of a single tubular, square tubing, whereas the lower beam member 20 is formed of two parallel, horizontally spaced apart square tubes 25 and 26, as indicated in FIGS. 3 and 4, attached together at intervals along their length by connecting ribs (not shown) that lie transverse to the tubes 25 and 26.

The upper beam member 19 is in a position approximately 2 feet above the lower beam member tubes 25 and 26 and lies in a vertical plane bisecting the space between the tubes 25 and 26 so that the beam 19, tubes 25 and 26, and brace members 21 and 22 form a generally A-frame type construction. In this way the center boom section 12 is formed of a rigid frame type construction that is durable and yet relatively light weight.

Each of the outer boom sections 11, as best shown in FIG. 1, includes a lower beam member 27 that lies in substantially the same horizontal plane as the lower beam member 20 of the center boom section and an upper beam member 28. The beam 28 has an inner end 29 at approximately the same height as an outer end 30 of the center boom section upper beam member 19 and extends therefrom on a slight decline for a distance of approximately equal to four-fifths the length of the lower beam member 27 and is fixed thereto by brace members 33, 34 and 35. To further strengthen the outer beam sections 11, reinforcing rods 36 are connected between the beam members 27 and 28 in a triangular configuration.

Figure 4:
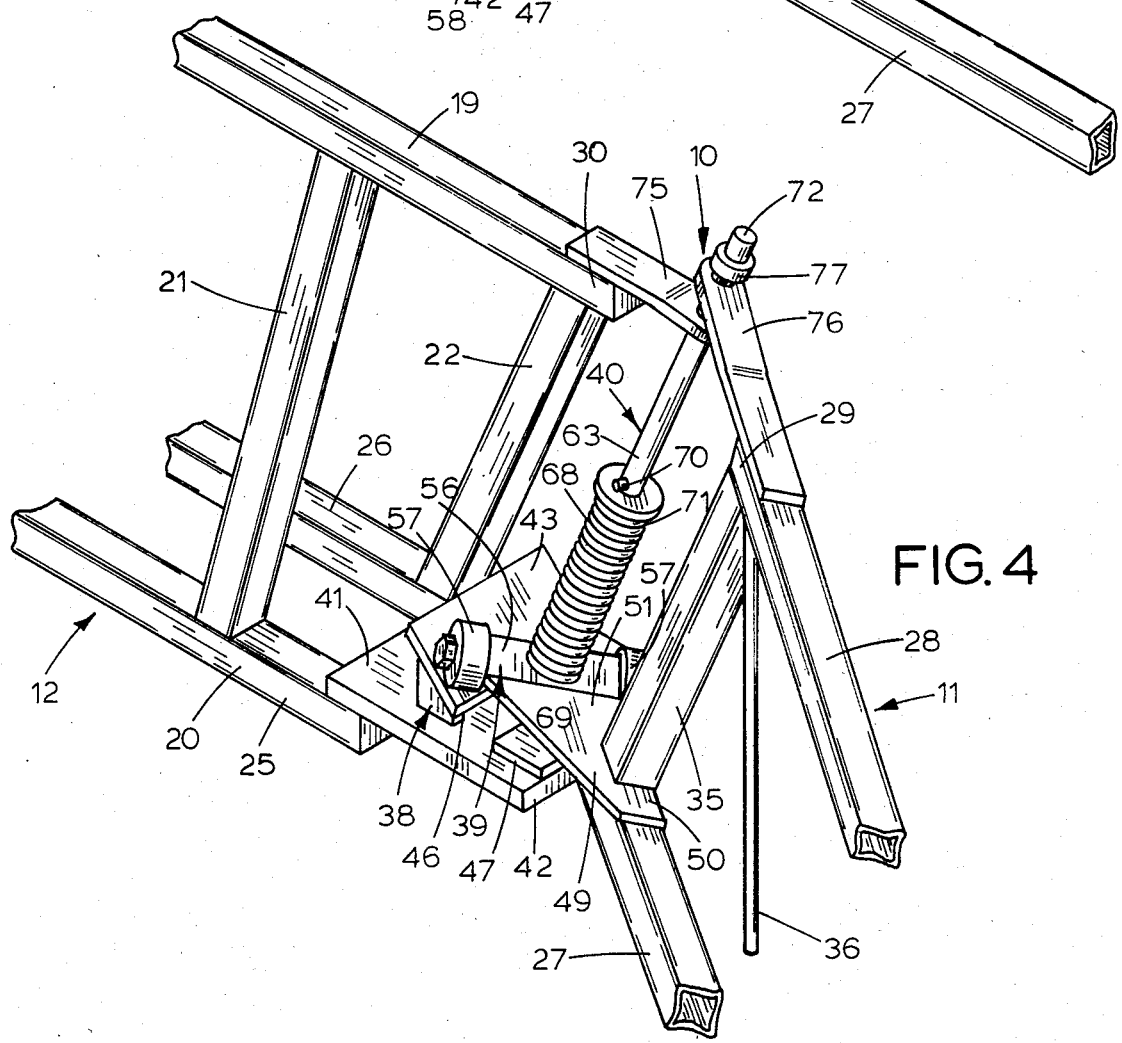
FIG. 4 is similar to that of FIG. 3 but shows the break away joint in a condition as the outer boom section is pivoted with respect to the center boom section.

Referring now to FIGS. 2, 3 and 4, the joint assembly 10 serves as a pivotal connection between the upper and lower beam members 19 and 20 of the center boom section 12 and the upper and lower beam members 27 and 28 of the outer boom sections 11. The assembly 10 includes an inclined ramp member 38, a stabilizing means 39 and a yieldable bias means 40. The inclined ramp 38 is fixed to an upper surface 41 of an extension plate 42 secured to the outer ends of the lower beam member tubes 25 and 26, as by welding, to extend outwardly therefrom. The ramp 38 has an inclined surface 43 facing in an outwardly direction and a truncated lower portion forming an abutment shoulder 46. In addition to the ramp 38, a relatively narrow ledge plate 47 is fixed to the outer edge of the plate upper surface 41 for a purpose to be described below.

Interposed between the inner most brace member 35 of the outer boom sections 11 and the lower beam members 27 of such section is a thin, flat extension member 49 having a relatively narrow inner portion 50 and a relatively wide end portion 51 that extends outwardly from the lower beam member 27. Secured to an outer end 51 of the extension member 49 is the stabilizing means 39 which is preferably formed of a rectangularly shaped body 56 having cylindrically shaped bearings 57 secured at its opposite ends.

When the boom 13 is in its normal unfolded condition, the extension member 49 substantially overlies the ledge plate 47 so that the stabilizing means 39 is positioned in a recess 58 defined by the ledge plate 47 and the abutment shoulder 46. The extension plate 42, as shown in FIG. 5, has an aperture 61 and the stabilizing body member 56 has a through bore 62 aligned with the aperture 61. The yieldable means 40 includes an axle shaft 63 that has a lower end 64 that is positioned through the aperture 61 and through bore 62 to extend upwardly from the bottom surface of the extension plate 42. A nut or other type retention member 65 is affixed to the lower end 64.

Referring again to FIGS. 2, 3 and 4, a coil spring 68 is mounted about the shaft 63 and is normally in a partially compressed condition abutting against the stabilizing means 39 at its lower end 69 and an abutment pin 70 in the shaft 63 at its upper end 71. Consequently, the coil spring 68 of the yieldable means 40 applies a constant biasing pressure that acts to urge the stabilizing means 39 to remain in the recess 58. In this way, a yieldable, pivotable connection is formed by the shaft 63 and spring 68 between the outer and center boom sections 11 and 12.

An upper end 72 of the axle shaft 63 extends through apertures 73 and 74 in extension arms 75 and 76 secured respectively to upper beam members 19 and 28. A cap 77 is fastened on the shaft upper end 72 to retain the extension arms 75 and 76 thereon. Thus, the shaft 63 serves as an axle about which the outer end sections 11 are pivoted. As best shown in FIG. 2, the pivotal connections between the upper beam members 19 and 28 and the lower beam members 20 and 27 are offset from one another and the extension arms 75 and 76 have complementry slanted ends so that the shaft 63 is disposed on a vertical incline. Accordingly, when the outer boom sections 11 are folded inwardly against the sides of the trailer 16 they will move in a slightly upward direction to raise them further above the ground and into a transporting position.

Because of the biasing force asserted by the coil spring 68 against the stabilizing means 39, the outer boom sections 11 are normally held in a colinear position with respect to the center boom section 12. However, the outer boom sections 11 can be folded inwardly against the sides of the trailer 16 by applying a sufficient force on the outer boom sections 11 to further compress the coil spring 68 to permit the stabilizing means 39 to rotate about the shaft 63 and out of the recess 58, as shown in FIG. 4. During rotation of the means 39, one of its ends 78 and the associated bearing 57 traverse the inclined surface 43 of the ramp 38. To begin rotation of the stabilizing means 39 requires a relatively large pivoting force on the outer boom sections 11 to move the stabilizing means 39 out of the recess 58. However, once rotation of the stabilizing means 39 is begun, less force is then required to complete pivoting action of the outer boom section 11 into a fully folded condition so as to provide a break away operation of the joint assembly 10.

Thus, the present invention provides a break away joint assembly that operates in a controlled efficient fashion to maintain the boom 13 in a straight condition during spraying operations. Although the outer boom sections 11 of the boom 13 may encounter pivoting forces, the boom will remain in the straight operating condition unless there is a force sufficient to cause the break away action of the joint assembly 10 to operate. Although the joint assembly 10 has been described with reference to a preferred embodiment, it should be well recognized by those skilled in the art that modifications may be made in such assembly without deviating from the true spirit of the invention. For example, rather than utilizing the shaft 63 for serving as the pivoting connection for the upper beam members 19 and 28, it would be possible to provide a separate pivoting connection for these members and the shaft 63 could be terminated at the pin 70.

I claim:

1. An improved break away joint assembly for connecting an outer boom section to a center boom section of an elongated spray boom to permit pivotal movement of said outer section with respect to said center section from a normal condition in which said sections are colinear to a folded condition, said joint comprising:
   (a) said outer boom section having a frame type construction formed of upper and lower vertically spaced apart beam members connected together by at least two brace members;
   (b) said center boom section having a frame type construction formed of upper and lower vertically spaced apart beam members connected together by at least two brace members;
   (c) means for pivotally connecting an outer end of the upper beam member of said center section with an inner end of the upper beam member of said outer section;
   (d) a first extension member extending outwardly from an outer end of the lower beam member of said center section and having a generally vertically directed aperture;
   (e) an inclined ramp member secured to an upper surface of said first extension member;
   (f) a second extension member extending outwardly from an inner end of the lower beam member of said outer section;
   (g) a stabilizing means on the outer end of said second extension member that overlies said first extension member and is transverse to said second extension member and the inclined surface of said ramp when said boom is in the normal condition, said means having a through bore generally in alignment with the aperture in said first member;
   (h) yieldable biasing means extended through said through bore and said aperture for pivotally connecting said first extension member and said stabilizing means together in such fashion that said stabilizing means is adjacent the lower end of the inclined surface of said ramp to thereby maintain said boom in the normal condition, and permitting said stabilizing means to rotate about the longitudinal axis of said yieldable means as said outer boom section is moved from the normal condition to the folded condition.

2. An improved break away joint assembly as described in claim 1 wherein the inclined surface of said ramp member has a truncated lower end portion that forms an abutment shoulder adjacent the stabilizing means when said boom is in the normal condition.

3. An improved break away joint assembly as recited in claim 2 wherein a ledge plate is secured to the upper surface of said extension member to form a recess for receiving said stabilizing means when said boom is in the normal condition.

4. An improved break away joint assembly as recited in claim 1 wherein said yieldable biasing means includes a shaft that is extended through said aperture and said through bore and has a portion projecting above said through bore mounting a coil spring in a partially compressed condition for providing a biasing pressure against said stabilizing means.

5. An improved break away joint assembly as recited in claim 1 wherein the means for pivotally connecting the upper beam members of said center section and said outer section comprises:
   (a) an extension arm on the outer end of the upper beam member of said center section;
   (b) an extension arm on the inner end of the upper beam member of said outer section; and
   (c) said shaft has an upper end that extends through the apertures in said upper beam member extension arms and serves as an axle for said pivotally connecting means.

* * * * *